United States Patent [19]

Miyachi

[11] Patent Number: 5,148,293
[45] Date of Patent: Sep. 15, 1992

[54] IMAGE FORMING APPARATUS CONTAINING ERASABLE FONT PATTERN

[75] Inventor: Hiroki Miyachi, Tokyo, Japan

[73] Assignee: Kabushiki Kaisha Toshiba, Kawasaki, Japan

[21] Appl. No.: 654,583

[22] Filed: Feb. 13, 1991

[30] Foreign Application Priority Data

Feb. 14, 1990 [JP] Japan .................................. 2-31472

[51] Int. Cl.$^5$ ............................................... H04N 1/21
[52] U.S. Cl. ................................. 358/444; 358/404; 395/115; 395/110; 395/116
[58] Field of Search .................. 358/404, 78, 403, 444; 364/519; 395/110, 115, 116, 165; 346/33 R

[56] References Cited

U.S. PATENT DOCUMENTS

| | | | |
|---|---|---|---|
| 4,866,671 | 9/1989 | Yokoyama | 364/519 |
| 4,912,670 | 3/1990 | Hattori | 395/115 |
| 4,975,859 | 12/1990 | Takagashi et al. | 364/519 |
| 4,984,182 | 1/1991 | Chang et al. | 364/519 |

Primary Examiner—Leo H. Boudreau
Assistant Examiner—Steven P. Klocinski
Attorney, Agent, or Firm—Foley & Lardner

[57] ABSTRACT

The image forming apparatus includes a receiver for successively receiving image data from an external device, a first memory for storing a basic font pattern, a second memory including a first memory area for storing a modified font pattern obtained by modifying the basic font pattern stored in the first memory, and a second memory area for storing bit image data, a generator for successively generating bit image data from the image data received by the receiver, using the basic font pattern stored in the first memory and the modified font pattern stored in the first memory area of the second memory, a first processor for expanding the bit image data generated by the generator into the second memory area of the second memory. The bit image data generated by the generator is expanded into the second memory area of the second memory. The second memory area, may be used up during the generated bit image expansion. The first memory area of the second memory is changed from a modified font pattern storage area, which is unused in the expanded bit image, to an additional bit image expansion area. The combination of the additional bit image expansion area and the second memory area of the second memory serve as a temporarily increased bit image expanding area.

8 Claims, 6 Drawing Sheets

FIG. 5B ved data.

IMAGE FORMING APPARATUS CONTAINING ERASABLE FONT PATTERN

BACKGROUND OF THE INVENTION

1. Field of the Invention

The present invention relates to an image forming apparatus such as a laser printer for receiving image data from, e.g., an external apparatus, and for printing received data.

2. Description of the Related Art

Image formation in an image forming apparatus such as a laser printer is attained via, e.g., electrification, exposure, developing, copying, peeling, cleaning, and electrification unit, an exposure unit, a developing it, a copy unit, a peeling unit, a cleaning unit, and the like are sequentially arranged around a photosensitive drum. The apparatus also comprises a fixing unit for receiving a paper sheet from the peeling unit. These units are driven upon rotation of the photosensitive drum, thereby executing the above-mentioned image formation processes. In this manner, an image can be formed on a paper sheet.

In a laser printer of this type, its control system is divided into an engine control section for controlling the above-mentioned units to control operations for attaining the image formation processes, and a printer control section for controlling operations of the engine control section. The engine and printer control sections are connected for exchanging commands and status data. The printer control section expands image information in units of pages supplied from an external equipment onto a partial memory to generate bit-image data, and then outputs the bit-image data to the engine control section.

Such a laser printer as mentioned above is provided with a ROM containing basic font patterns, and has a so-called "derive function." For the derive function, the buffer area (RAM) for expanding the bit image previously stores thick fonts, italic fonts, and modified fonts in which the direction of the font is rotated. These various fonts are derived from the basic fonts in the ROM. Since these derived fonts occupies a certain part of the RAM, the amount of the buffer area for expanding the bit image is reduced.

Data expanded in the buffer area of bit image expanding is transferred to the engine controller, and the corresponding image is formed therein. Because of the previous storing of the derived font data, if the buffer area of bit image expanding has been reduced to less than one required to fully hold the image data of one page, this image data has to be divided into pieces so that each data piece can be held in the reduced buffer area.

In this case, a number of expanding and transferring operations for the image data pieces ar repeated so as to complete a full image formation of the bit image data. Such repeated operations require a relatively long period of time. If these repeated operations were not completed within a predetermined time limit, the resultant image formation would be defective.

Even if font data produced by the derive function is not used in the bit image expanding page, defective expansion of the bit image could result when the bit image expanding area is actually narrowed by the produced font data.

SUMMARY OF THE INVENTION

It is, accordingly, an object of the invention to provide an image forming apparatus in which, when the buffer area is used up during expanding bit image data, a memory area of unused font data (e.g., unused modified actual size of the bit image expanding buffer area is temporarily increased by the released memory area of the unused font data, to thereby avoiding defective image formation.

To achieve the above object, the image forming apparatus of the present invention comprises: (a) a receiver for successively receiving image data from an external device; (b) a first memory for storing a basic memory area for storing a modified font pattern obtained by modifying the basic font pattern stored in the first memory, and a second memory area for storing bit image data; (d) a generator for successively generating the bit image data from the image data received by the receiver, using the basic font pattern stored in the first memory and the modified font pattern stored in the first memory area of the second memory; (e) a first processor for expanding the bit image data generated by the generator into the second memory area of the second memory; and (f) a second processor for, when the bit image data generated by the generator is expanded (written) into the second memory area of the second memory, and the second memory area, provided for a bit image expanding area, is used up during the generated bit image expansion, changing use of the first memory area of the second memory from a modified font pattern storage area, which is unused in the expanded bit image, to an additional bit image expansion area, wherein a combination of the additional bit image expansion area and the second memory area of the second memory serves as a temporarily increased bit image expanding area.

According to the present invention, when the bit image expanding area is used up while the received image data is expanded to the bit image, a free memory area for the unused modified font pattern storage is switched to the additional bit image expansion area, thereby temporarily increasing the area for expanding the bit image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

An embodiment of the present invention will be described below with reference to the accompanying drawings.

Figure 1:
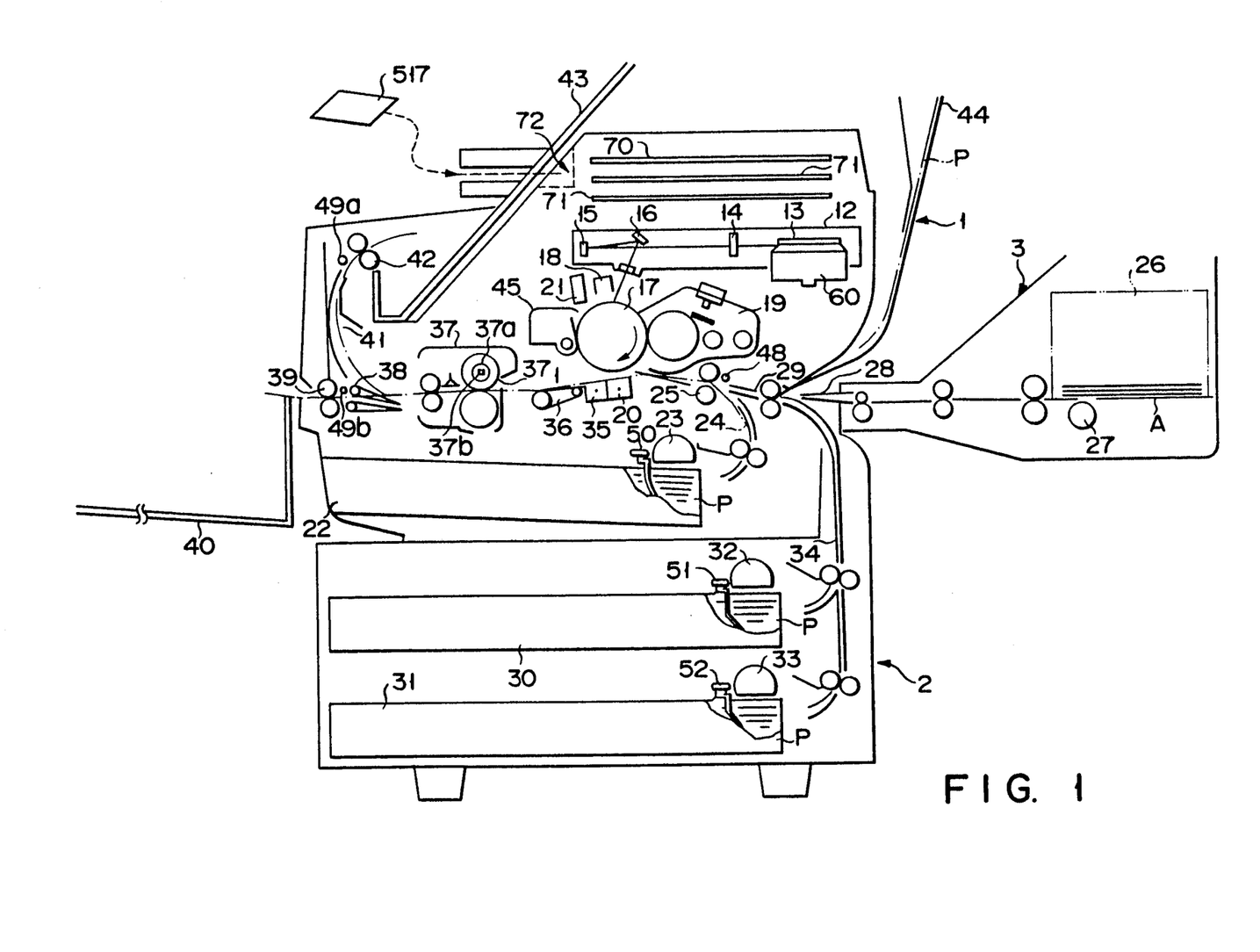
FIG. 1 is a sectional view showing an internal structure of a laser printer.

FIG. 1 shows an image forming apparatus of the present invention, e.g., an image forming unit apparatus as a laser printer comprising optional equipment.

More specifically, in the image forming unit apparatus, optional equipments such as multi-cassette feeder 2 for feeding paper sheets (normal paper sheets) P having a predetermined thickness, e.g., cut sheets as image recording media into printer 1, envelope feeder 3 for feeding paper sheets (thick sheets) A, thicker than normal sheets, such as envelopes, as recording media, a jogger as a selector device for distributing paper sheets P or A after image formation in units of predetermined number of sheets, and the like, are connected to laser printer 1.

Multi-cassette feeder 2, envelope feeder 3, and the jogger are connected to a control section (not shown) in the main body of laser printer 1 in an on-line manner. Operation panel 100 (FIG. 2) is arranged on the upper surface of laser printer 1.

In laser printer 1, paper feed cassette 22, feed roller 23, aligning roller pair 25, convey belt 36, gate 38, paper discharge roller pairs 39 and 42, and the like are arranged in addition to a process system such as laser optical system 12, photosensitive drum 17, electrification unit 18, developing unit 19, copy unit 20, discharging unit 21, peeling unit 35, fixing unit 37, cleaning unit 45, and the like.

Laser optical system 12 comprises a semiconductor laser oscillator (not shown) for generating a laser beam, a collimator lens (not shown) for collimating a laser beam from the oscillator, polygonal mirror (rotary mirror) 13 as a rotary member having an octahedral mirror portion for reflecting the laser beam from the lens for each scanning line, fCNCq lens 14, mirrors 15 and 16, mirror motor 60 for rotating (driving) polygonal mirror 13, and the like.

In an image forming operation, a laser beam from laser optical system 12 corresponding to an image signal from an external equipment (not shown) (or operation panel 100) is focused on a surface of photosensitive drum 17. Photosensitive drum 17 is rotated in a direction of an arrow in FIG. 1. The surface of drum 17 is charged by electrification unit 18, and is then exposed by laser optical system 12 in correspondence with the image signal. More specifically, the laser beam emitted from the semiconductor laser oscillator is scanned at a predetermined speed from the left to the right of photosenstive drum 17 upon rotation of polygonal mirror 13 by mirror motor 60, thereby forming an electrostatic latent image on the surface of drum 17. The latent image is developed by a toner by developing unit 19, thus forming a visual image.

On the other hand, paper sheets P as image recording media in paper feed cassette 22 are picked up one by one by feed roller 23. Each sheet is guided to aligning roller pair 25 via paper guide path 24, and is then fed to a copy section by roller pair 25.

Paper sheet P picked up from paper feed cassette 30 in multi-cassette feeder 2 one by one by feed roller 32 and guided to aligning roller pair 25 via paper guide paths 34 and 29; paper sheet P picked up from paper feed cassette 31 one by one by feed roller 33 and guided to aligning roller pair 25 via paper guide paths 34 and 29; paper sheet A picked up from stacker 26 in envelope feeder 3 one by one by feed roller 27 and guided to aligning roller pair 25 via paper guide paths 28 and 29; or paper sheet P fed from manual paper feed unit 44 and guided to aligning roller pair 25 via paper guide path 29 is fed to the copy section in accordance with an instruction from the external equipment or operation panel 100.

Paper sheet P or A fed to the copy section is brought into tight contact with the surface of photosensitive drum 17 on copy unit 20, and the toner image on photosensitive drum 17 is copied onto the sheet upon operation of copy unit 20. Paper sheet P or A on which the toner image is copied is peeled from photosensitive drum 17 upon operation of peeling unit 35, and is fed to fixing unit 37 by convey belt 36. The copied image is thermally fixed on the paper sheet by heat roller 371 for generating heat for a fixing operation. Heat roller $37_1$ incorporates heater lamp 37a used for heating.

Paper sheet P or A, after the fixing operation, is fed onto paper discharge tray 40 by paper discharge roller pair 39 via gate 38. Alternatively, paper sheet A is fed to upper convey path 41 by gate 38, and is exhausted on paper discharge tray 43 movably supported by the jogger by paper discharge roller pair 42.

After the copy operation, a residual toner is removed from photosensitive drum 17 by cleaning unit 45, and an after image is erased by discharging unit 21. In operation.

Note that fixing unit 37 has a unit structure (fuser unit), and is independently detachable from printer 1. Aligning switch 48 for detecting a paper feed error to the copy section side is arranged in front of aligning roller pair 25, and paper discharge switches 49a and 49b for detecting a paper discharge error are 42, respectively.

Paper sensors 50, 51, and 52 for detecting paper sheets P are respectively arranged above paper feed presence/absence of paper sheets P in paper feed cassettes 22, 30, and 31.

An engine control circuit board carrying engine controller 70 for controlling electrical units arranged in printer main body 1 to control operations for executing electrophotographic processes, and a circuit board carrying printer controller 71 for controlling operations of engine controller 70 are arranged above laser optical system 12.

A maximum of three circuit boards for printer controller 71 can be loaded in accordance with a degree of addition of functions (e.g., kinds of fonts, kanji, and the like are expanded). Functions can be further added by inserting IC cards 517 for adding functions in three IC card connectors 72 arranged at the front edge portion of the circuit board for printer controller 71. A connector (not shown) to be connected to host apparatus 409 (to be described later) as an external output unit such as an electronic computer, a word processor or the like is arranged at the left end face portion of the circuit board for printer controller 71.

Operation panel 100 comprises a liquid crystal display for displaying a sheet count, a mode, a guide message, and the like, an LED indicator for indicating various states by turning on LEDs, a switch for instructing various operations, and an on-line key for switching an on-line/off-line mode.

The arrangement of the engine control section will be described below.

Figure 2:
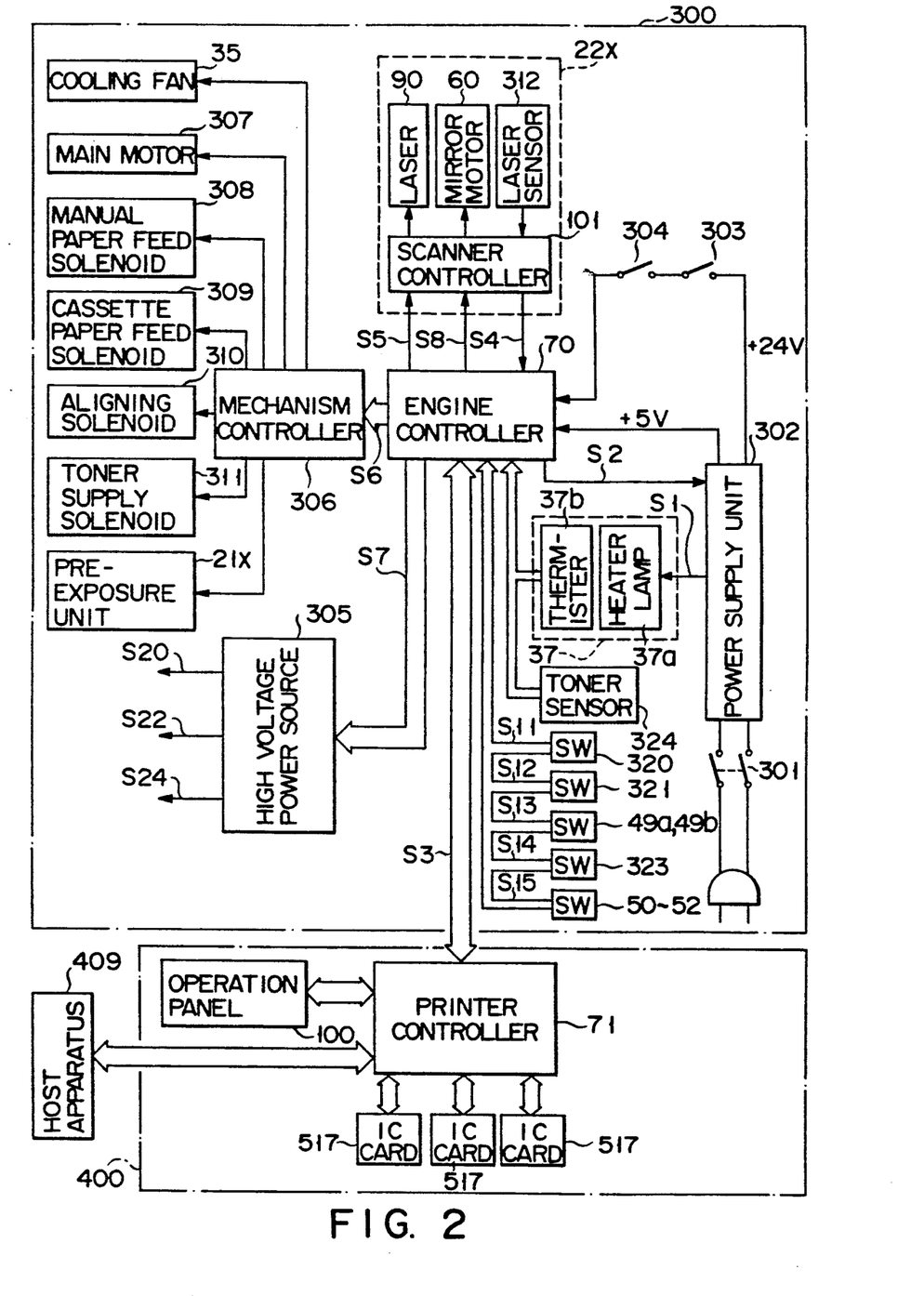
FIG. 2 is a block diagram showing an arrangement of main part of an engine control section.

FIG. 2 is a block diagram showing an arrangement of main part of engine control section 300. In FIG. 2, reference numeral 302 denotes a power supply unit which outputs power supply voltages of +5 V and +24 V when main switch 301 is turned on. The +5 V power supply voltage is supplied to engine controller 70, and is supplied to printer controller 71 via engine controller 70. The +24 V power supply voltage is supplied to engine controller 70 via cover switches 303 and 304 in turn. The power supply voltage is then supplied to scanner controller 101, high voltage power source 305, and mechanism controller 306 via engine controller 70. Scanner controller 101 then supplies the power supply voltage to semiconductor laser 90 and mirror motor 92, and mechanism controller 306 supplies the power supply voltage to pre-exposure unit 21X, main motor 307, manual feed solenoid 308, cassette paper feed solenoid 309, aligning solenoid 310, toner supply solenoid 311, cooling fan 500, and the like as their driving power source.

Power supply unit 302 includes a zero-crossing switch type heater lamp controller (not shown), comprising, e.g., a photo triac coupler and a triac, for driving heater lamp 37a in fixing unit 3. The +24 V voltage is used as a driving power source for a light-emitting LED of the photo triac coupler.

In the heater lamp controller with this arrangement, when the light-emitting LED is turned on/off, the light-emitting photo triac is turned on/off at a zero-crossing point of an AC power source, thereby turning on/off a triac as a main switch element at the next stage. In this manner, AC power source S1 is supplied to or cut from heater lamp 37a. Heater control signal S2 for turning on/off the light-emitting LED is supplied from engine controller 70 to power supply unit 302, and a temperature signal detected by thermistor 37b arranged in fixing unit 37 is supplied to engine controller 70.

Cover switch 303 is turned off when a top cover (not shown) is pivoted upward, and cover switch 304 is turned off when a rear cover (not shown) is opened. Therefore, when the top or rear cover is opened, the +24 V voltage is cut off by switch 303 or 304, so that operations of semiconductor laser 90, mirror motor 60, high voltage power source 305, main motor 307, solenoids 308, 309, 310, and 311, cooling fan 500, heater lamp 37a, and the like are stopped. As a result, an operator can safely touch the interior of printer main body 1.

Figure 3:
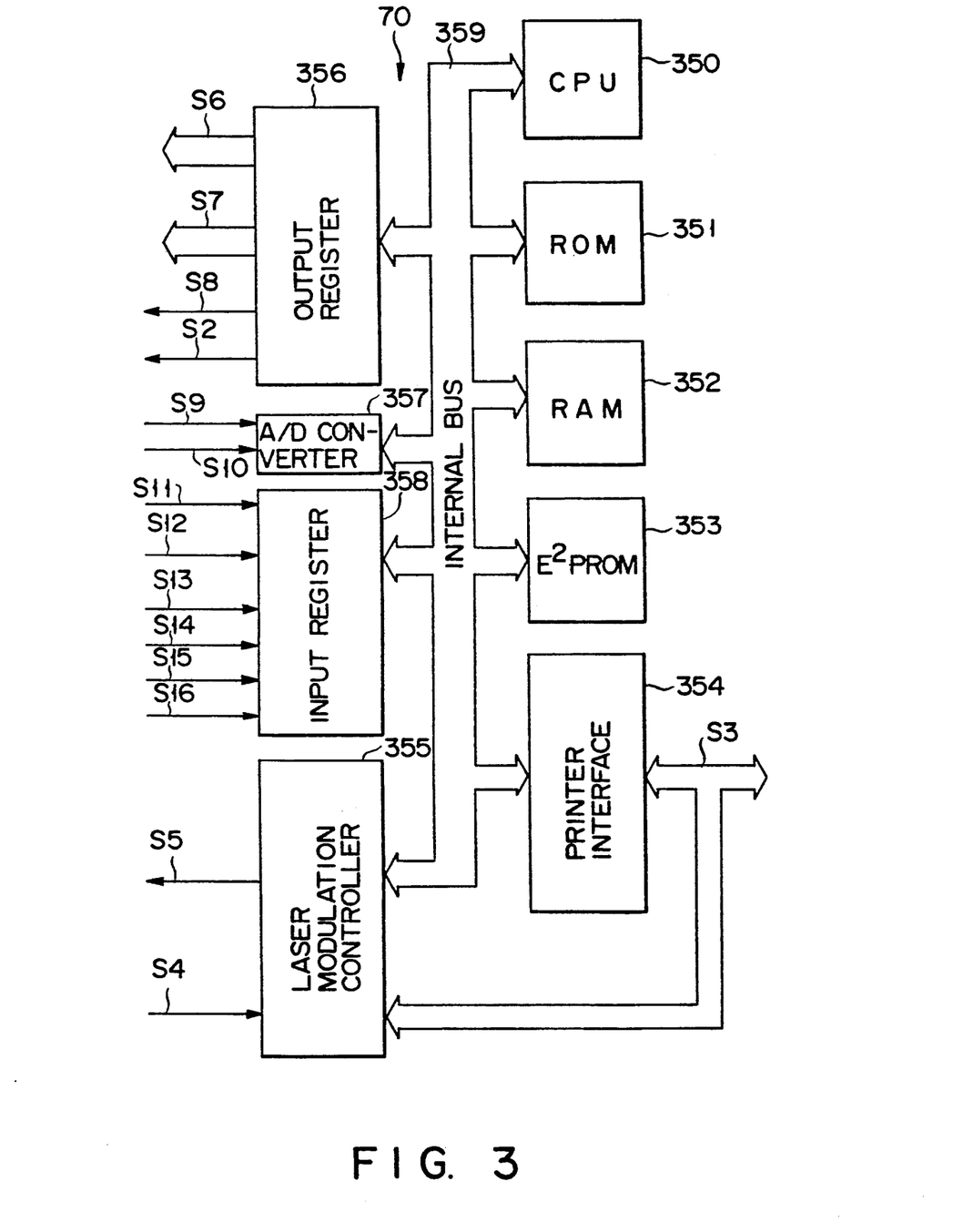
FIG. 3 is a block diagram showing an arrangement of an engine controller.

FIG. 3 is a block diagram showing an arrangement of engine controller 70. In FIG. 3, CPU 350 controls entire engine control section 300, and is operated in accordance with a control program stored in ROM 351. RAM 352 is used as a working buffer for CPU 350. E²PROM 353 stores a total print count, and the like. Printer interface 354 interfaces exchange of interface signal S3 with printer controller 71.

Laser modulation controller 355 periodically and forcibly turns on semiconductor laser 90 in order to generate laser beam detection signal S4, and modulates semiconductor laser 90 in accordance with image data sent from printer controller 71 in response to interface signal S3. In this case, controller 355 outputs laser modulation signal S5 to scanner controller 101.

Output register 356 outputs control signals S6, S7, S8, and S2 for respectively controlling mechanism controller 306, high voltage power source 305, scanner controller 101, and the heater lamp controller. A/D converter 357 receives voltage signals S9 and S10 generated by thermistor 37b and toner sensor 324, and converts these voltage values into digital values. Input register 358 receives state signals S11, S12, S13, S14, and S15 from paper empty switch 320, manual feed switch 321, paper discharge switch 49a and 49b, mount switch 323, aligning switch 48, and paper sensors 50, 51, and 52 and ON/OFF state signal S16 of the +24 V voltage.

Internal bus 359 is used for exchanging data among CPU 350, ROM 351, RAM 352, E2PROM 353, printer interface 354, laser modulation controller 355, output register 356, A/D converter 357, and input register 358.

Mechanism controller 306 includes drivers for driving various motors, clutches, and solenoids, and these drivers are ON/OFF-controlled in accordance with binary control signal S6 output from output register 356. More specifically, each driver is turned on when signal S6 is "1", or is turned off when it is "0", thereby supplying or cutting off the +24 V voltage to or from pre-exposure unit 21X, main motor 307, solenoids 308 to 311, and cooling fan 500.

Scanner controller 101 includes drivers for semiconductor laser 90 and mirror motor 60. Semiconductor laser 90 is ON/OFF-controlled by laser modulation signal S5 output from laser modulation controller 355. Mirror motor 60 is ON/OFF-controlled by control signal S8 output from output register 356.

Laser beam detection sensor 312 comprises a PIN diode. When laser beam a passes through laser beam detection sensor 312, a current proportional to its light energy flows through the PIN diode. This current signal is sent to laser modulation controller 355 as laser beam detection signal S4.

High voltage power source 305 outputs developing bias, electrification, and copy high voltage signals S20, S22, and S24 to a developing bias power supply unit (not shown), electrification unit 18, and a wire high voltage supply unit (not shown) of copy unit 20. These signals are ON/OFF-controlled by "1" or "0" level of control signal S7 output from output register 356.

As described above, in engine control section 300, a power supply voltage is supplied to electrical circuits via engine controller 70, and respective units are controlled by binary control signals output from engine controller 70. Engine control section 300 is coupled to printer control section 400 (to be described later) via interface signal S3.

The arrangement of printer control section 400 will be described below.

Figure 4:
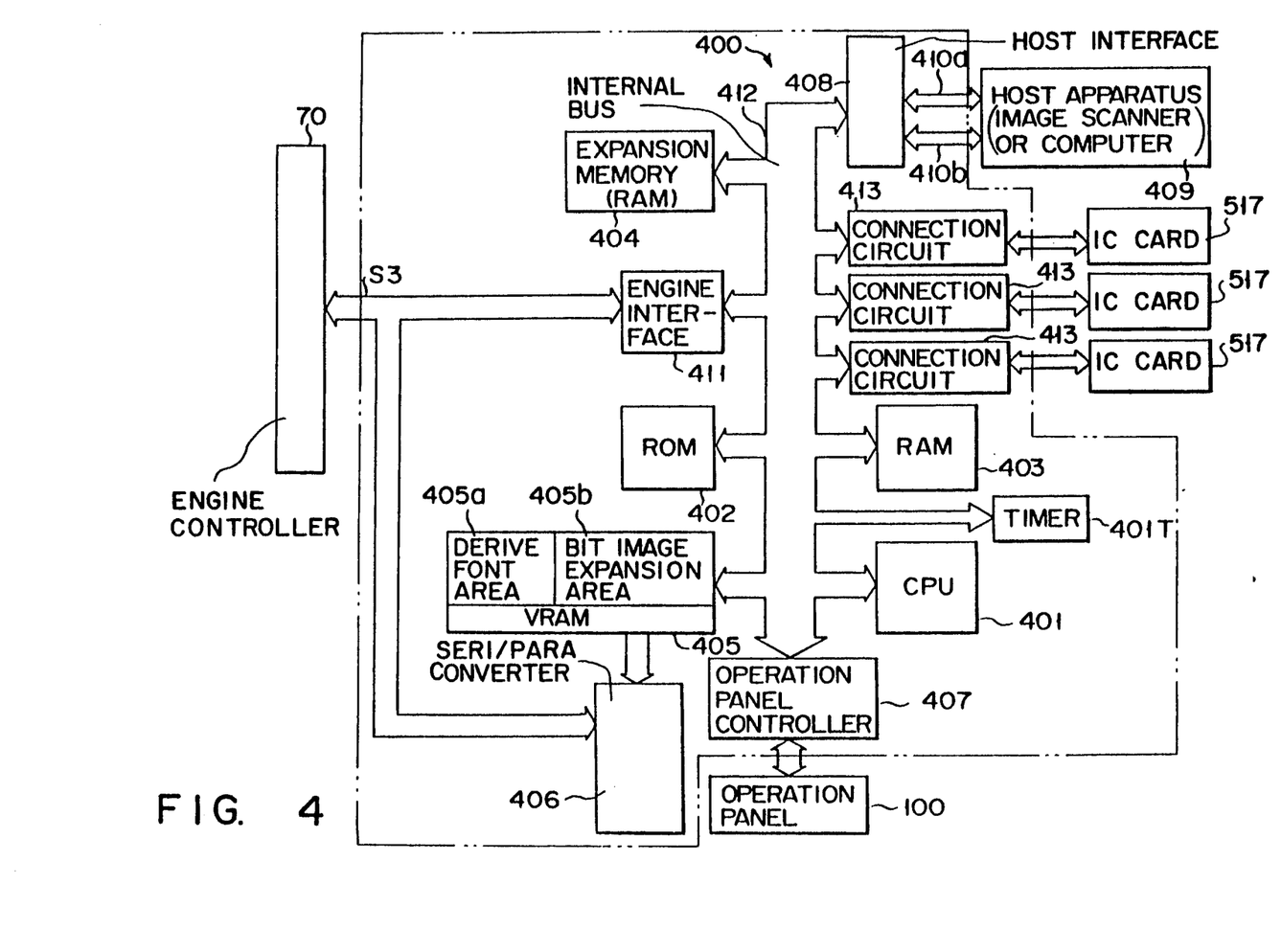
FIG. 4 is a block diagram showing an arrangement of the main part of a printer control section.

FIG. 4 is a block diagram showing an arrangement of main part of printer control section 400. In FIG. 4, CPU 401 controls entire printer control section 400. CPU 401 is connected to timer 401T via internal bus 412. This timer is used for timing control of respective processing operations to be executed by CPU 401. ROM 402 dance with the program stored in ROM 402. ROM 402 also stores an identification number which is verified when data is altered; data associated with paper sheet P such as a top margin, a left margin, a paper type, and the basic font data (bit image data) for a basic font pattern; and the like.

RAM 403 is used as a page buffer for temporarily storing image data sent from host apparatus 409. Expansion memory 404 is a large-capacity memory used when RAM 403 cannot store data for one page when image data sent from host apparatus 409 is one having a large data volume such as bit map data.

Video RAM 405 stores image data of expanded bit image, and the output therefrom is supplied to serial/parallel converter 406.

Video RAM 405 is formed of derive font area 405a and bit image expanding area 405b. Stored in derive pattern stored in ROM 402, slanted (Italic) fonts thereof, and derived fonts (modified font patterns) thereof which are obtained by, for example, rotating the expanding area 405b is bit image data which is obtained by expanding the image data in the page buffer area of RAM 403, using the basic fonts in ROM 402 and the derived fonts in derive font area 405a.

Incidentally, areas 405a and/or 405b can be addressed in RAM 403 in addition to or in place of video RAM 405.

Serial/parallel converter 406 converts image data expanded to bit-image data in video RAM 405 and sent as parallel data into serial data, and supplies the serial data to engine controller 70.

Host interface 408 is used for exchanging data between host apparatus 409 comprising an electronic computer or an image reading apparatus (image scanner) and printer control section 400 and comprises two kinds of transfer lines, i.e., serial transfer line 410a and parallel transfer line 410b. These lines can be selectively used in accordance with a kind of data transferred between host apparatus 409 and printer control section 400.

Engine interface 411 interfaces the exchange of interface signal S3 between printer controller 71 and engine controller 70. Each of connection circuits 413 cuts off a power supply voltage to be supplied to IC card 517 and signal lines when IC card 517 is inserted in or removed from a connector (not shown), thereby preventing data stored in IC card 517 from being destroyed by noise generated when the card is inserted or removed.

Operation panel controller 407 performs display control of a guide message on the liquid crystal display on operation panel 100, ON/OFF/flashing control of the LED indicator, control for sending data input from the switch to CPU 401, and the like. Internal bus 412 is used for exchanging data among CPU 401, ROM 402, RAM 403, expansion memory 404, video RAM 405, operation panel controller 407, host interface 408, engine interface 411, and connection circuits 413.

IC card 517 comprises a nonvolatile memory such as a battery backup static RAM, an E$^2$PROM, an EPROM, a mask ROM, or the like. Each IC card 517 stores character fonts, an emulation program, and the like.

Figure 5A:
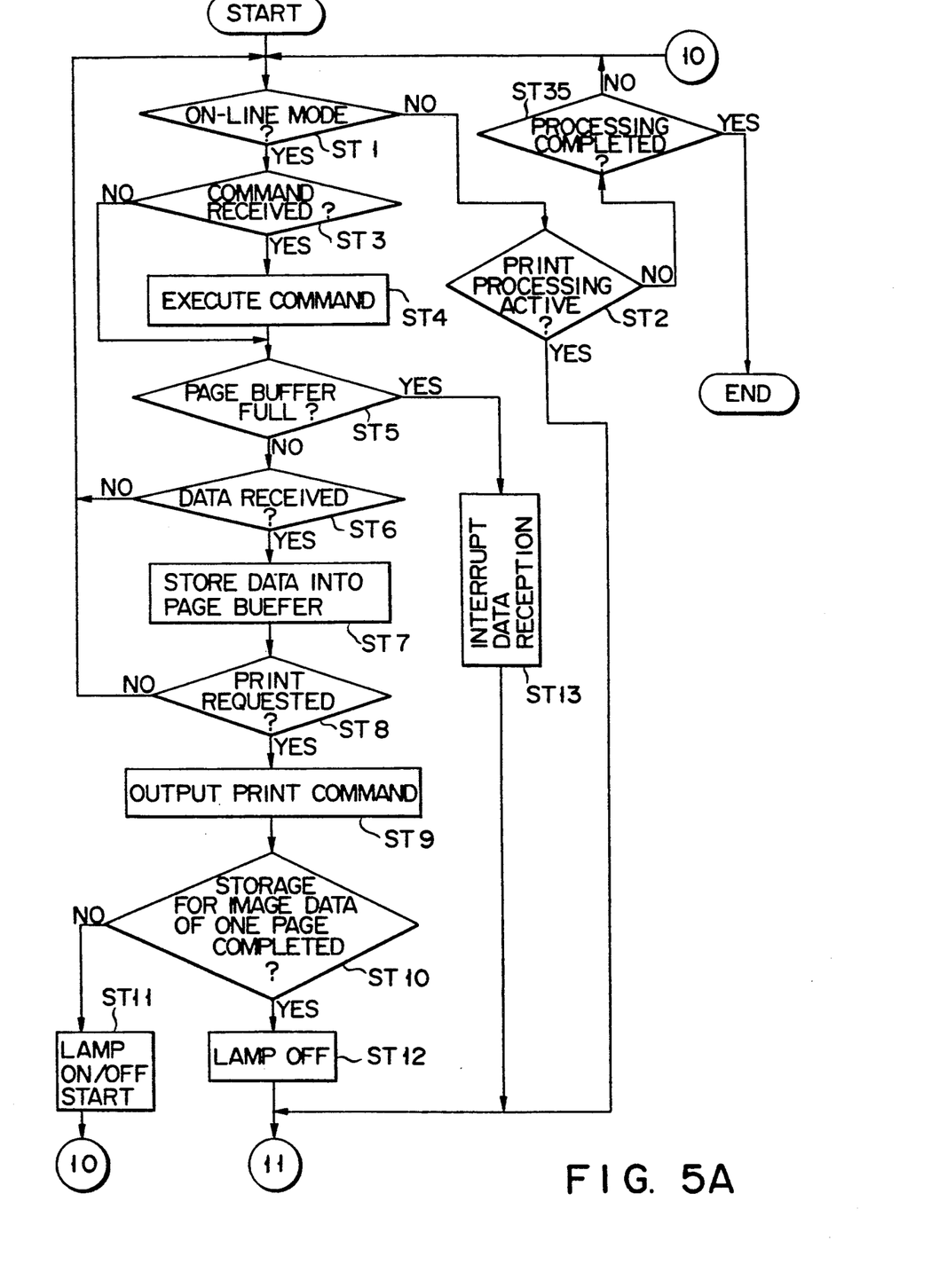
FIGS. 5A and 5B are flow charts showing the operation of a printer controller.
Figure 5B:
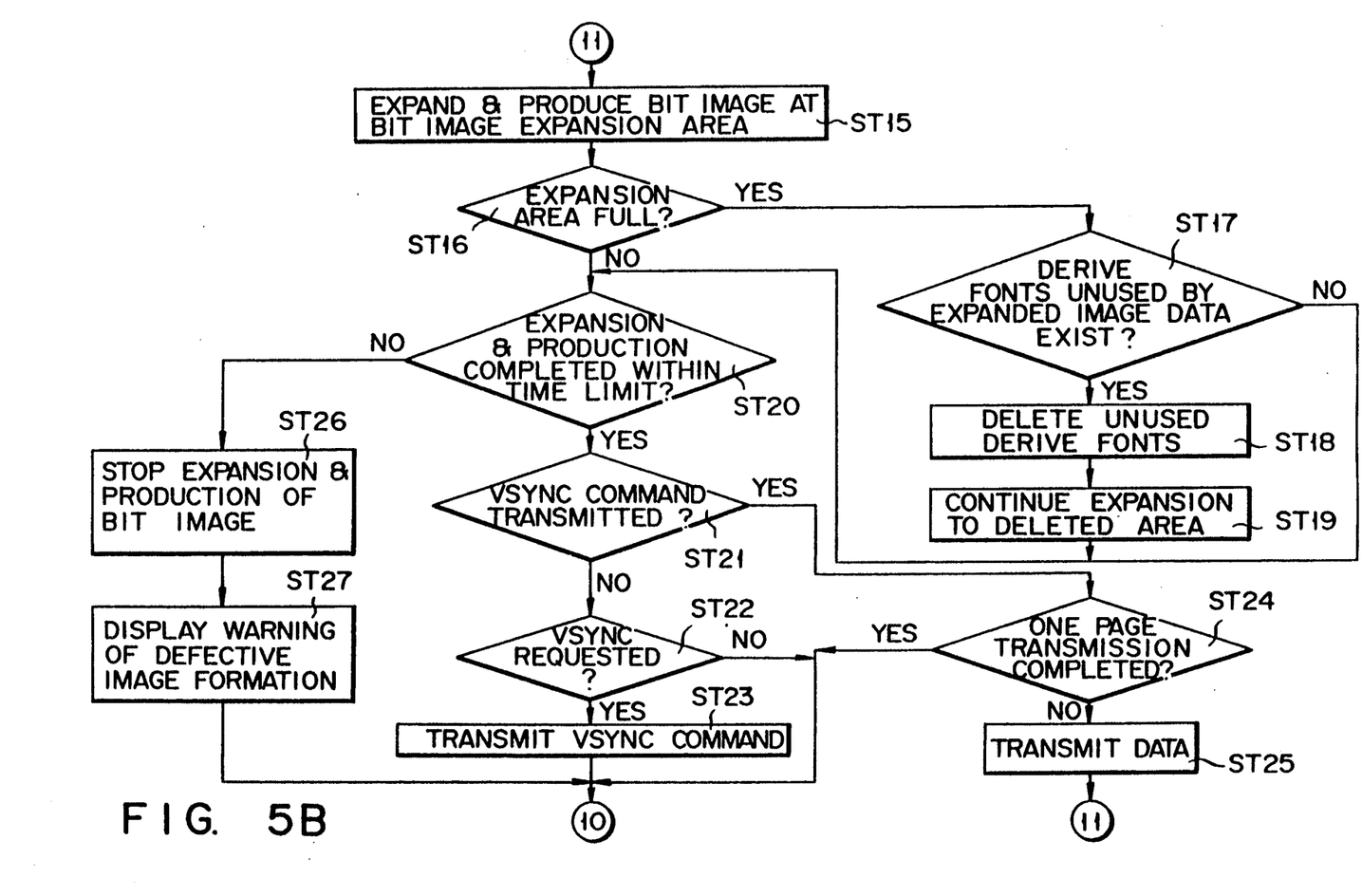

The operation of printer control section 400 (in particular, CPU 401) shown in FIG. 4 will be described below with reference to the flow charts shown in FIGS. 5A and 5B.

For example, if the laser printer shown in FIG. 1 is set in an off-line state, and CPU 401 detects this off-line state (NO in ST1), it is checked if print processing of previous data received from host apparatus 409 is completed (ST2). If it is determined that a print processing is being executed (YES in ST2), the flow branches to step ST15 in FIG. 5B to continue the print processing. On the other hand, if it is determined that processing of printer control section 400 itself is not yet completed (NO in ST35), although the print processing repetitively executed to establish an idling state, thus waiting for the on-line state of the laser printer.

If it is determined that the laser printer is set in the on-line state (YES in ST1), it is checked if data sent from host apparatus 409 is a command. If it is determined that the received data is a command (YES in ST3), the received command is executed (ST4); otherwise, the flow skips command execution step ST4, and advances to step ST5. For example, the command defines attributes of data following the command, and controls the printer without exchanging data.

It is then checked if the page buffer arranged as a buffer for receiving data in RAM 403 is full. If it is determined that the buffer is not full (NO in ST5), it is checked if data sent from host apparatus 409 is image data (VD). If it is determined that the received data is not image data (NO in ST6), the flow returns to step ST1, and the series of steps described above are repetitively executed to wait for reception of a command or image data. If it is detected in this state that image data is received (YES in ST6), the received image data is sequentially stored in the above-mentioned page buffer (RAM 403) (ST7).

Subsequently, it is checked if a print request is issued. If it is determined that no print request is issued (NO in ST8), it is determined that the engine side is not ready for printing. In this case, the flow returns to step ST1, and the series of steps described f the print request is detected (YES in ST8), it is determined that engine control section 300 is ready for printing, and CPU 401 outputs a print command (ST9).

It is then checked if storage of image data for one page is completed. If it is determined that the storage operation is not completed (NO in ST10), a "data" lamp of the LED indicator arranged in operation panel 100 reception operation, the "data" lamp is flashed to inform the current state to an operator. The flow returns to step ST1, and the series of steps described above are executed to wait until image data for one page is stored in the page buffer (403).

If it is determined that storage of image data one page is completed upon repetitive execution of the series of steps (YES in ST10), the "data" lamp is turned off (ST12), and data reception processing is ended. The control advances to print processing in step ST15 and subsequent steps.

If it is determined in step ST5 that the page buffer (403) is full (YES in ST5), the data reception operation is interrupted (ST13), and the control also advances to print processing in step ST15 and subsequent steps.

When storage of the one page image data into the page buffer (403) is completed, CPU 401 expands each image data corresponding to, e.g., 64 lines of image data stored in the page buffer (403), to generate bit image data, using the basic fonts in ROM 402 and the derive fonts in derive font area 405a of video RAM 405, and the generated bit image data (representing character image) is stored in bit image expanding area 405b (ST15).

During the bit image expansion mentioned above, CPU 401 checks whether bit image expanding area 405b in video RAM 405 becomes full. If it is detected that bit image expanding area 405b is full (yes in ST16), CPU 401 subsequently checks whether there exist derive fonts which are not used by the current expanded image data in page buffer (403). When unused derive fonts are found (yes in ST17), data of the unused derive fonts is erased from derive font area 405a (ST18), and the erased area is used for continuing the bit image expansion (ST19).

When bit image expanding area 405b is not full at step ST16, when there is no derive font unused at step ST17, or when the expansion/generation of the bit image data is performed at step ST19, then CPU 401 judges whether or not the bit image expansion processing is completed normally, by checking whether the expansion/generation of the bit image data has been completed within a predetermined time limit (ST20).

If the bit image expansion processing is completed normally (yes in ST20), it is checked whether the VSYNC command has already been transmitted. When it is detected that the VSYNC command has not yet been transmitted (no in ST21), then it is checked whether the VSYNC request is output from the engine side. If the VSYNC request has not yet been output (no in ST22), the above steps is repeated until the VSYNC request is output. When it is detected that the VSYNC request is output (yes in ST22), the VSYNC command is sent to the engine side (ST23), and the program sequence returns to step ST1. Then, the program sequence enters another state in which the CPU waits for the input of horizontal sync signal HSYNCO and video clock VCLKO.

If the VSYNC command has already been transmitted (yes in ST21), then it is checked whether the one page image data transmission is completed. When this image data transmission has not yet been completed (no in ST24), the image data of 64 lines of the bit image stored in bit image expansion area 405b is sent to the engine side in synchronism with horizontal sync signal HSYNCO and video clock VCLKO (ST25). Thereafter, CPU 401 returns to the program sequence of step ST15 and, while executing the above-mentioned steps, enters the state in which the CPU waits for the completion of transmission of the one page image data.

When the one page image data transmission is completed, the program sequence returns to step ST1 and printer controller 71 is initialized, so that the CPU enters a state wherein image data of the next page can be transmitted.

If it is detected that the bit image expansion has not been performed normally, or the bit image expansion has not completed within the time limit (no in ST20), CPU 401 interrupts the expansion, generation, and transmission of the bit image corresponding to the image data stored in the page buffer (403) (ST26), and sends a command for feeding paper P. Thereafter, CPU 401 displays at the liquid crystal display part on operation panel 100 an alert indicating that defective image(s) is (are) formed (ST27), and the program sequence returns to step ST1. The processing of the subsequent pages are continued similarly.

As has been mentioned above, if the buffer area for a bit image expansion is used up while the image data received from a host apparatus is expanded into bit image data, part of the memory area for data generated by the derive function, which part is not used for the current expanded bit image data, is switched to the additional bit image expansion area, thereby to temporarily increase the area for expanding the bit image. Accordingly, incomplete (i.e., defective) expansion to the bit image is avoided so that the resultant image can be free of defects, or a rate of occurrence of defective images can be minimized.

According to the present invention, if a memory area for a bit image expansion is used up while the image data received from an external device is expanded into bit image data, another memory area for a modified font pattern which is not used for the current expanded bit image data is switched to an additional bit image g the bit image. A defect free image forming apparatus can thus be obtained.

Additional advantages and modifications will the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A data processing apparatus comprising:
   means for receiving data to be processed from a host apparatus;
   first memory means for storing a plurality of character patterns including a basic font pattern and modified font patterns
   means for forming a bit image data from the received data, using the character patterns stored in said first memory means;
   second memory means for storing the bit image data formed by said forming means; and
   means for changing a specific portion of said first memory means to an additional storage area for storing the formed bit image data when said second memory means is filled up by the formed bit image data formed by said forming means, said specific portion having a storing part for storing a modified font pattern not used for the formed bit image data.

2. An apparatus according to claim 1, wherein said first memory means includes:
   means for storing the basic font pattern of said character patterns; and
   means for storing the modified font patterns which are obtained by modifying said basic font pattern,
   and wherein said second memory means includes a bit image data storage portion being common to part of said first memory means.

3. An apparatus according to claim 2, further comprising:
   means for expanding, at said second memory means, said bit image data and data containing at least one of said basic and modified font patterns, so as to produce said bit image data.

4. An apparatus according to claim 1, wherein said basic font pattern includes a predetermined standard font pattern, and said modified font patterns include a deformed font pattern obtained by deforming said standard font pattern.

5. An apparatus according to claim 1, further comprising:
   means for detecting whether the bit image data formed by said forming means contains defective image data.

6. An image forming apparatus comprising:
   means for receiving data to be processed from a host apparatus;
   first memory means for storing data of a basic pattern;
   second memory means for storing data of modified patterns obtained by modifying the basic pattern, and optionally storing bit image data;
   means for forming the bit image data from the received data, using said basic pattern and said modified patterns;
   third memory means for storing the bit image data formed by said forming means;
   means for changing a function of said second memory means from the modified pattern data storage, which is unused in forming the bit image data, to an additional bit image data storage when the bit image data formed by said forming means is stored in said third memory means, and if the third memory means is filled up during the bit image data storage; and means for printing a pattern corresponding to the bit image data stored in said second and third memory means on an image forming medium.

7. A data processing apparatus comprising:

means for receiving data to be processed from a host apparatus;

first memory means for storing a plurality of character patterns including a predetermined standard font pattern and deformed font patterns obtained by deforming said standard font pattern;

means for forming a bit image data from the received data, using the character patterns stored in said first memory means;

second memory means for storing the bit image data formed by said forming means; and means for changing a specific portion of said first memory means to an additional storage area for storing the formed bit image data when said second memory means is filled by the formed bit image data formed by said forming means, said specific portion having a storing part for storing character patterns not used for the formed bit image data.

8. An apparatus according to claim 7, further comprising:

means for detecting whether the bit image data generated by said generating means contains defective image data.

* * * * *